Aug. 3, 1965  H. M. ROBINSON ETAL  3,199,010
VARIABLE SPEED DIGITAL CONVERTER MOTOR
Filed Aug. 22, 1960  2 Sheets-Sheet 1

HORACE M. ROBINSON
GERALD W. MIDDY
INVENTORS.

BY Flam and Flam
ATTORNEYS.

HORACE M. ROBINSON
GERALD W. MIDDY
INVENTORS.
BY Flam and Flam
ATTORNEYS.

United States Patent Office 3,199,010
Patented Aug. 3, 1965

3,199,010
VARIABLE SPEED DIGITAL CONVERTER MOTOR
Horace M. Robinson, Los Angeles, and Gerald W. Middy, La Canada, Calif., assignors to Space Ship, Incorporated, Los Angeles, Calif., a corporation of Nevada
Filed Aug. 22, 1960, Ser. No. 50,892
9 Claims. (Cl. 318—165)

This invention relates to a variable speed alternating current motor.

An object of this invention is to provide a motor excited by alternating current that has a continuously variable speed range from maximum in one direction, to and through zero, to maximum in the other direction.

An object of this invention is to provide a motor of this character that has synchronous operation, and that requires no rotor windings, brushes or slip rings.

Use is made of a stator structure having windings generally corresponding to those of a multiple phase system to provide angularly spaced magnetic poles together with a salient pole rotor. All of the stator windings are excited by a single phase source. But the excitation carrier for each of the various sections is modulated in out of phase relationship to the remaining sections. Upon sequential modulation of the waves at any desired frequency, the maximum field intensity rotates about the stator at a rate corresponding to the frequency of modulation. The position or rotation of the rotor is independent of other factors, such as the carrier waveform and precise carrier frequency. Accordingly, the rotor follows the maximum field strength and in synchronous relationshiup to the modulation frequency. By causing the period of modulation to be controlled, a number of revolutions of the rotor can correspondingly be controlled. Accordingly, a system of this character is quite adaptable as a servomotor that does not require a stabilizing feedback loop.

Another object of this invention is to provide a variable speed system in which the losses in the motor are substantially constant throughout a large speed range. Yet another object of this invention is to provide a variable speed motor of this character in which the maximum torque is substantially constant at all speeds including zero speed. Another object of this invention is to provide a variable speed motor of this character in which, up to the maximum torque capacity of the machine, the speed is constant and independent of fluctuations in line voltages. Another object of this invention is to provide an exact positioning device in which a precise relationship without the requirement of feedback loops may be achieved by application of a signal.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings.

Figure 1:
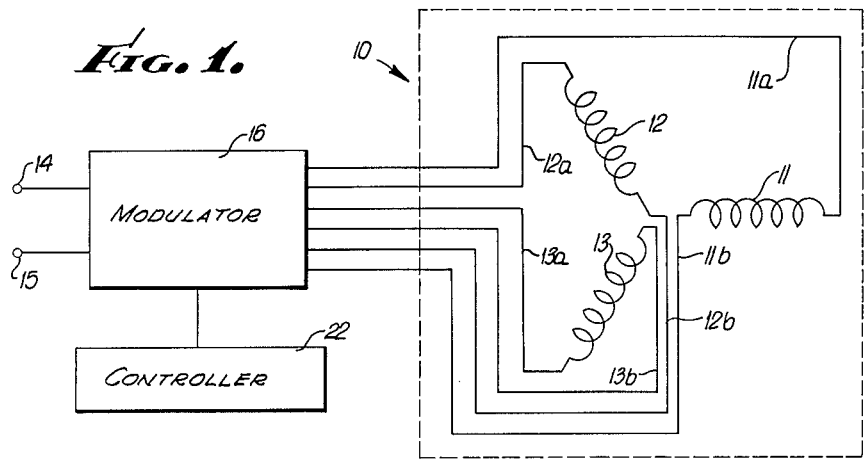
FIGURE 1 is a diagrammatic representation of the stator circuit of a device incorporating the present invention.

In FIG. 1 a stator structure 10 is illustrated having three windings 11, 12 and 13 arranged generally as phases of a multiphase device. These winding sections may be of any suitable type, each providing sinusoidal distributed flux when excited, and together providing uniformly spaced flux axes or pole pairs.

Each of the windings 11, 12 and 13 is supplied with excitation voltage from an alternating current power source, as indicated at terminals 14 and 15. Each of the windings 11, 12 and 13 has a pair of leads 11a, 11b, 12a, 12b and 13a, 13b respectively cooperable with the terminals 14 and 15. However, a modulator 16 to be presently described is interposed between alternating current terminals 14 and 15 and the leads for the winding sections 11, 12 and 13.

Assuming that the windings 11, 12 and 13 are equally energized, the magnetomotive force pulsates uniformly about the stator.

Figure 3:
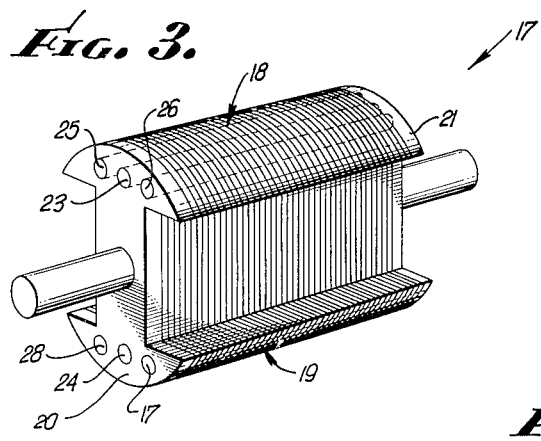
FIG. 3 is a pictorial view of a rotor for use with the stator of FIG. 1.

Located within the stator is a rotor structure 17 illustrated in FIG. 3. The rotor structure has salient poles. For example, it may have two poles, generally illustrated at 18 and 19 formed by a series of iron laminations generally of I-shape.

Placed at the ends of the rotor structure are conductive stampings, or end plates corresponding in shape to the rotor laminations, and designated at 20 and 21. The purpose of these conductive end plates will be presently described.

The rotor laminations, being of magnetic material, act like an armature of an alternating current solenoid in the pulsating field produced by the stator structure. If the poles 18 and 19 are not aligned with the pole axes produced by one of the windings 11, 12 and 13, it will move into alignment with the closest one. This occurs, of course, by virtue of the fact that the rotor naturally seeks a position of minimum reluctance.

Assuming, however, that the phases are unequally excited, the rotor 17 can be induced to leave its position of alignment with one pole and move to the succeeding pole. Thus, if the rotor is in alignment with a pole produced by the winding 11, and the excitation thereat is reduced to zero, the rotor will assume alignment with whichever of the adjacent poles corresponding to the windings 12 and 13 is stronger. Accordingly, by modulating the amplitudes of the excitation of the respective phases 11, 12 and 13, the rotor can be rotated.

Figure 2:
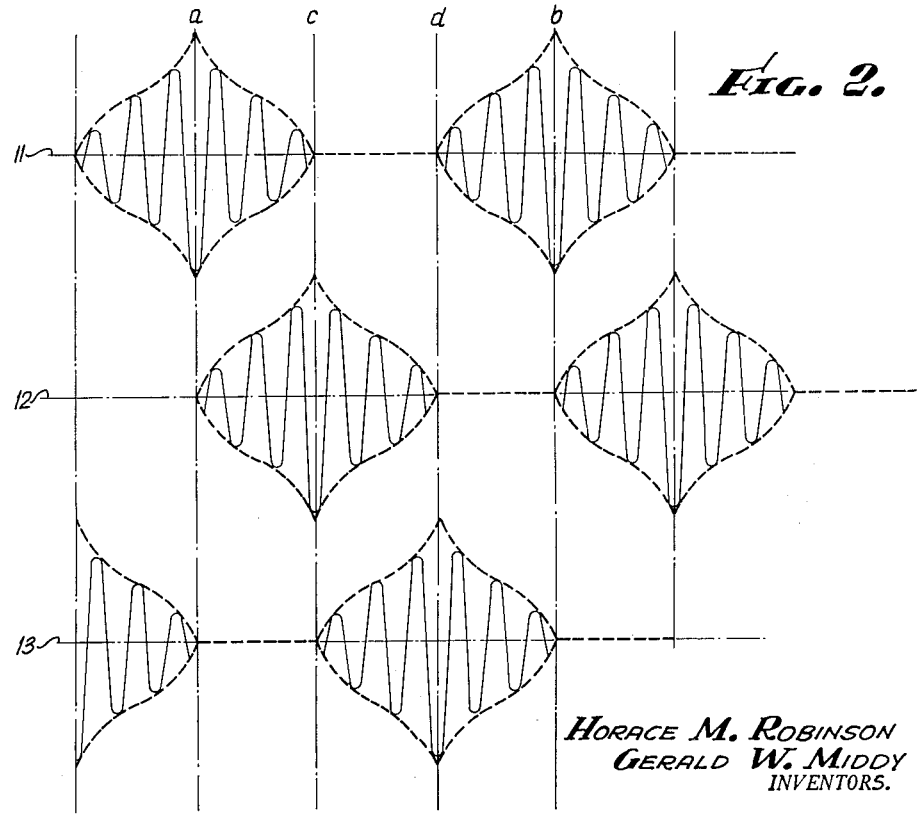
FIG. 2 is a diagram illustrating the excitation of the several sections of the armature.

In FIG. 2 there is illustrated an excitation pattern provided by the modulator 16 for the respective windings 11, 12 and 13, excitation being plotted as a function of time. Points $a$ and $b$ mark consecutive maxima of the modulation to envelope for the winding 11. The modulator 16 may, for example, be any suitable type of function generator in combination with a controllable power amplifier.

The windings 11, 12 and 13 are modulated in three phase relationship. Thus, the excitation for the winding 11 is at a maximum ($a$) at 120° in advance of the maximum ($c$) of the winding 12, and 240° in advance of the maximum ($d$) of the winding 13. To accomplish this three-phase modulation, the modulator 16 is provided. An adjustable controller 22 cooperates with the modulator 16 to determine the frequency of modulation.

It will be noted from FIG. 2 that the modulation produced by the modulator 16 causes the excitation of the winding 11 to be reduced to zero for a 120° span. Assuming that the rotor 17 is approximately aligned with the poles produced by the winding 11 at a time $c$, it will then be apparent that the rotor by virtue of the reluctance effect, will tend to move into alignment with the pole produced by the winding 12, since its excitation is greater than that of the winding 13. At about the time $d$, the field at the poles for winding 12 is reduced to zero, whereas the field at the poles for the winding 13 is dominant. Accordingly, the rotor 17 tends to move into alignment with the poles produced by the winding 13. It may readily be appreciated that by virtue of the reluctance effect, the rotor tends to move or rotate at a frequency corresponding to the frequency of modulation.

As thus far described, the rotor operating by virtue of reluctance effect alone, exhibits rather poor torque characteristics. Even a slight load will cause the rotor to pull out of step and stall. In order to enhance very substantially the torque characteristics of the rotor, use is made of an armortisseur-like winding. The armortisseur winding is made up of the end plates 20 and 21 and conductive bars 23 and 24. The bars 23 and 24 extend through axial bores in the respective rotor poles 18 and 19 immediately below the pole surface. The ends of the bars 23 and 24 are electrically joined to the plates 20 and 21. The bars 23 and 24 between their ends are insulated from the surrounding iron structure by normal oxide coating on the bars. The bars 23 and 24 together with the end rings 20 and 21, form a conductive loop that has an axis at right angles to the axes of the poles 18 and 19.

If the rotor is rotating in synchronism with the modulation frequency, and if the load angle between the axis of the rotor poles and the axis of maximum field strength is zero, the flux distribution in the rotor structure is entirely symmetrical about a bisecting axial plane. No flux then links the armortisseur winding. If, however, due to the imposition of torque, the load angle changes from zero, to a finite value, then the flux distribution in the rotor becomes asymmetrical, there being a concentration of flux on the leading edges or tips of the poles. In such circumstances flux links the armortisseur windings 20, 21, 23, 24. This flux is produced by the fundamental wave, not the modulation wave. This linking flux, acting on the short circuited loop 20, 21, 23, 24 produces a circulating current that in turn creates a field. The induced field tends to restore the symmetrical orientation of rotor flux, and hence tends to reduce the load angles of the rotor 17. Hence a restoring torque is created that does not exist in ordinary reluctance motors where the restoring torque exists only by virtue of transient effects.

Thus, an armortisseur winding in a conventional or typical reluctance motor serves only as a damper winding, in that, upon loss of synchronism a voltage will be induced at the value corresponding to the slip, whereas in the present instance the carrier wave is at all times available to serve as a means for inducing currents for producing restoring forces. Of course, if the rotor 17 in the present organization approaches pull out torque and actually begins to lose its synchronism, voltages will be induced tending to circulate currents in the armortisseur winding not only as a result of this fundamental frequency, but also as a result of slip with respect to the modulating frequency.

Since the rotor 17 is in actuality an A.C. solenoid, a chattering or pulsating operation can be minimized if the flux in the armortisseur winding 23, 24 is precluded from dropping to zero. For this purpose, damper windings are provided.

The damper windings are provided in this instance by a pair of bars 25 and 26 in the pole 18 and a pair of bars 27 and 28 in the pole 19. The bars 25 and 26 extend parallel to the armortisseur bar 23 on opposite sides thereof and connect to the end plates 20 and 21. The damper bars 27 and 28 are similarly situated with respect to the armortisseur bar 24. It is apparent that the bars 25 and 26 together with the end rings 20 and 21 form a loop, the axis of which is parallel to the axes of the rotor poles. The bars 27 and 28 similarly operate. The loop formed by the bars 25 and 26 forms a shading coil effective to shift the flux periodically and to smooth the pulsations of flux in the armortisseur windings 20–23–21–24. In addition, bars 25 and 26 form supplemental loops with their symmetrically disposed counterparts 27 and 28, all of the bars being connected via the end plates 20 and 21. Thus, the damper bars 25 and 26 serve a two-fold function. They not only provide a damping loop, but also supplement the action of the armortisseur winding.

The specific shape of the modulation wave controls the forces exerted upon the rotor and hence the uniformity of rotation. The position of the rotor is a function of the ratio of the field strengths at the two active poles. To obtain uniform rotation, the rate of change of that ratio must be constant. Furthermore, the sum of the voltages of the active sections is desirably constant whereby the requirements of the supply are simplified. This accounts for the peculiar peaked wave shape illustrated. Proper operation may be provided by one of the phases being quiescent, one increasing and the other decreasing.

Figure 5:
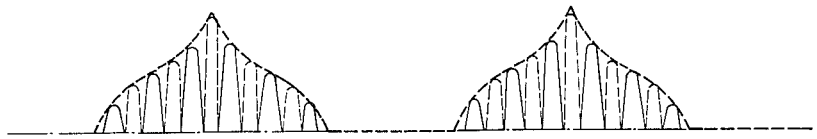
FIG. 5 is a diagram similar to FIG. 2, but illustrating a different mode of excitation control.
Figure 6:
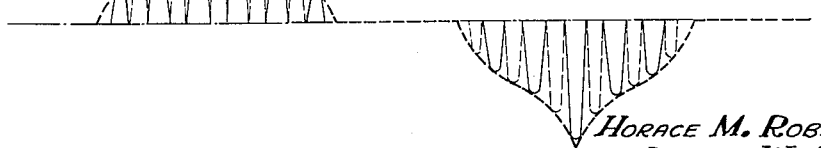
FIG. 6 is a diagram similar to FIG. 5, illustrating still another mode of excitation control.

In FIGS. 5 and 6 different wave shapes are illustrated that may be usable in the system just described. In FIG. 5 the carrier wave is actually a series of direct current pulses, the overall amplitude of which rises and falls in accordance with the modulation frequency. It will be apparent that the rotor will equally follow the changing intensities as in the form illustrated in FIG. 2. The pulses may represent a half wave rectification, or a full wave rectification as indicated by the supplemental pulses shown in dotted lines.

In the form illustrated in FIG. 6, the excitation is essentially a direct current but it reverses in polarity in accordance with the modulation frequency. Similarly, the rotor structure of FIG. 3 will follow the intensity changes.

Since the restoring torque produced by the rotor arises primarily from the carrier frequency, the torque is maintained at a very high value even when the modulation frequency is reduced to zero. Hence, a brushless synchronous machine is produced that for the first time provides excellent torque characteristics.

Figure 4:
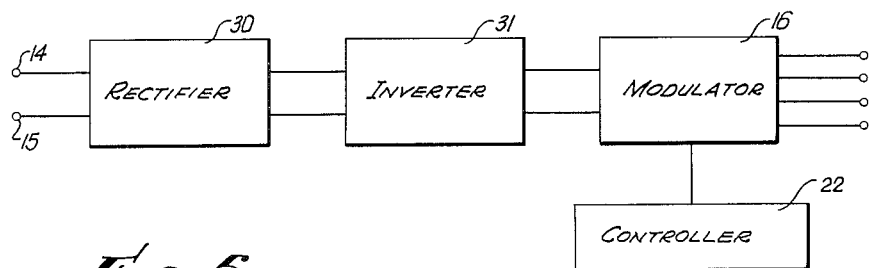
FIG. 4 is a diagrammatic view similar to FIG. 1 illustrating a modified form of the present invention.

The modulation frequency loses its significance as it approaches the carrier wave frequency so far as determining the synchronous operation of the rotor is concerned. Accordingly, if a large speed range is required, a carrier frequency of higher value can be utilized. This may be accomplished, for example, as illustrated in FIG. 4 in which a rectifier 30 is connected to the A.C. power terminals 14 and 15. The rectifier 30 provides a direct current output that is converted to a high frequency by an inverter 31. The high frequency output of the inverter 31 then provides the unmodulated input to the modulator 16.

The motor described is capable of fulfilling various functions where exact positioning is required, as for example where servo-systems have in the past been used, and in computer structures. In order to derive a single revolution at a remote place, it may be possible simply to produce one cycle of modulation on the field windings.

Also, the controller 22 may be the final stage of a logical circuit. In any event, the controller provides the pilot signal for the modulator.

The inventors claim:

1. In a synchronous variable speed motor: a stator member; a rotor member; a plurality of primary winding sections for one of the members, and capable of separate excitation; said primary winding sections defining field axes located in spaced relationship about the axis of the corresponding member; circuit means cooperable with a common alternating current source for exciting said windings; means for amplitude modulating the excitation of the winding sections in multiphase relationship and at a frequency less than the frequency of the alternating current source whereby the maximum field strength is rotated angularly about the said one member at a speed proportional to the modulating frequency; the other member having salient poles influenced by the field of said one member; and short circuited winding means carried by the other member and linked by the flux when the rotor operates at a power angle greater than zero.

2. In a synchronous variable speed motor: a stator member; a rotor member; a plurality of primary winding sections for one of the members, and capable of separate excitation; said primary winding sections defining field axes located in spaced relationship about the axis of the corresponding member; circuit means cooperable with a common alternating current source for exciting said windings; means for amplitude modulating the excitation of the winding sections in multiphase relationship and at a frequency less than the frequency of the alternating current source whereby the maximum field strength is rotated angularly about the said one member at a speed proportional to the modulating frequency; the other member having salient poles influenced by the field of said one member; short circuited winding means carried by the other member and linked by the flux when the rotor operates at a power angle greater than zero and damper winding means for smoothing the pulsations of flux at said short circuited winding.

3. In a synchronous variable speed motor: a rotor having salient poles; means supporting the rotor for rotation about an axis; a conductor bar extending through each pole in a direction substantially parallel to the said axis of said rotor; end members for the rotor and connecting the bars in short circuit loop relationship so that the effective axis of the short circuit loop is substantially in quadrature relationship to the pole axis of the rotor; a stator; a plurality of stator winding sections capable of separate excitation for defining field axes located in spaced relationship about the axis of the stator and with respect to which the salient poles of the rotor are capable of simultaneous alignment; circuit means for exciting all of said windings from a common alternating current source; and means for amplitude modulating the excitation to the several windings in multiphase relationship at a frequency less than that of the alternating current source whereby the maximum stator field strength is rotated angularly about the stator at a speed proportional to the frequency of modulation.

4. In a synchronous variable speed motor: a rotor having salient poles; means supporting the rotor for rotation about an axis; a conductor bar extending through each pole in a direction substantially parallel to the said axis of said rotor; end members for the rotor and connecting the bars in short circuit loop relationship so that the effective axis of the short circuit loop is substantially in quadrature relationship to the pole axis of the rotor; a stator; a plurality of stator winding sections capable of separate excitation for defining field axes located in spaced relationship about the axis of the stator and with respect to which the salient poles of the rotor are capable of simultaneous alignment; circuit means for exciting all of said windings from a common alternating current source; means for amplitude modulating the excitation to the several windings in multiphase relationship at a frequency less than that of the alternating current source whereby the maximum stator field strength is rotated angularly about the stator at a speed proportional to the frequency of modulation and short circuited damper winding means for each pole.

5. In a synchronous variable speed motor: a rotor having salient poles; means supporting the rotor for rotation about an axis; a conductor bar extending through each pole in a direction substantially parallel to the said axis of said rotor; end members for the rotor and connecting the bars in short circuit loop relationship so that the effective axis of the short circuit loop is substantially in quadrature relationship to the pole axis of the rotor; a stator; a plurality of stator winding sections capable of separate excitation for defining field axes located in spaced relationship about the axis of the stator and with respect to which the salient poles of the rotor are capable of simultaneous alignment; circuit means for exciting all of said windings from a common alternating current source; means for amplitude modulating the excitation to the several windings in multiphase relationship at a frequency less than that of the alternating current source whereby the maximum stator field strength is rotated angularly about the stator at a speed proportional to the frequency of modulation; a pair of damper bars for each pole and extending on opposite sides of the corresponding conductor bar, the damper bars of each pair being connected together at their ends.

6. In a synchronous variable speed motor: a rotor having salient poles; means supporting the rotor for rotation about an axis; a conductor bar extending through each pole in a direction substantially parallel to the said axis of said rotor; end members for the rotor and connecting the bars in short circuit loop relationship; a stator; a plurality of stator winding sections capable of separate excitation for defining field axes located in spaced relationship about the axis of the stator and with respect to which the salient poles of the rotor are capable of simultaneous alignment; circuit means for exciting all of said windings from a common alternating current source; means for amplitude modulating the excitation to the several windings in multiphase relationship at a frequency less than that of the alternating current source whereby the maximum stator field strength is rotated angularly about the stator at a speed proportional to the frequency of modulation; a pair of damper bars for each pole and extending on opposite sides of the corresponding conductor bar, the damper bars of each pair being connected at their ends to the corresponding end members.

7. In a synchronous variable speed motor: a stator member; a rotor member; a plurality of primary winding sections for one of the members, and capable of separate excitation; said primary winding sections defining field axes located in spaced relationship about the axis of the corresponding member; circuit means cooperable with a common alternating current source for exciting said windings; and means for amplitude modulating the excitation of the winding sections in three phase relationship and at a frequency less than the frequency of the alternating current source, and so that the winding sections are energized for a phase angle of approximately 240° resulting in only two of the phases being active at any one time, the rate of change of the ratio of excitation of the active phases being constant, thereby resulting in uniform rotation of said rotor member.

8. In a synchronous variable speed motor: a stator member; a rotor member; a plurality of primary winding sections for one of the members, and capable of separate excitation; said primary winding sections defining field axes located in spaced relationship about the axis of the corresponding member; circuit means cooperable with a common alternating current source for exciting said windings; and means for amplitude modulating the excitation of the winding sections in three phase relationship and at a frequency less than the frequency of the alternating current source, and so that the winding sections are energized for a phase angle of approximately 240° resulting in only two of the phases being active at any one time, the rate of change of the ratio of excitation of the active phases being constant, thereby resulting in uniform rotation of said rotor member, the sum of the excitations of the phases at any time being constant.

9. In a synchronous variable speed motor: a rotor having salient poles; means supporting the rotor for rotation about an axis; a plurality of conductor bars extending through each pole in a direction substantially parallel to the said axis of said rotor; and members connecting corresponding conductor bars of the respective poles together and in short circuit looped relationship so that the effective axis of the short-circuited loop is substantially in quadrature relationship to the pole axis of the rotor; a stator; a plurality of stator winding sections capable of separate excitation for defining field axes located in spaced relationship about the axis of the stator and with respect to which the salient poles of the rotor are capable of simultaneous alignment; circuit means for exciting all of said windings from a common alternating current source; and means for amplitude modulating the excitation to the several windings in multiphase relationship at a frequency less than that of the alternating current source whereby the maximum stator field strength is rotated angularly about the stator at a speed proportional to the frequency of modulation.

References Cited by the Examiner

UNITED STATES PATENTS

| | | | |
|---|---|---|---|
| 2,072,894 | 3/37 | Lelja | 310—163 |
| 2,418,193 | 4/47 | Peterson | 318—23 |
| 2,665,403 | 1/54 | Pestarini | 318—165 |

JOHN F. COUCH, *Primary Examiner.*

ORIS L. RADER, *Examiner.*